(12) United States Patent
Ishikawa

(10) Patent No.: US 11,530,338 B2
(45) Date of Patent: Dec. 20, 2022

(54) METHOD FOR DISMANTLING ADHESIVE STRUCTURE

(71) Applicant: LINTEC CORPORATION, Tokyo (JP)

(72) Inventor: Masakazu Ishikawa, Tokyo (JP)

(73) Assignee: LINTEC CORPORATION, Tokyo (JP)

( * ) Notice: Subject to any disclaimer, the term of this patent is extended or adjusted under 35 U.S.C. 154(b) by 414 days.

(21) Appl. No.: 16/637,200

(22) PCT Filed: Aug. 6, 2018

(86) PCT No.: PCT/JP2018/029479
§ 371 (c)(1),
(2) Date: Feb. 6, 2020

(87) PCT Pub. No.: WO2019/031466
PCT Pub. Date: Feb. 14, 2019

(65) Prior Publication Data
US 2020/0224062 A1    Jul. 16, 2020

(30) Foreign Application Priority Data

Aug. 9, 2017 (JP) .............................. JP2017-154769

(51) Int. Cl.
*B29C 65/04* (2006.01)
*C09J 7/29* (2018.01)
(Continued)

(52) U.S. Cl.
CPC ................. *C09J 7/29* (2018.01); *B29C 65/04* (2013.01); *C09D 187/00* (2013.01); *C09J 5/06* (2013.01);
(Continued)

(58) Field of Classification Search
CPC combination set(s) only.
See application file for complete search history.

(56) References Cited

U.S. PATENT DOCUMENTS 6,855,760 B1    2/2005 Kirsten et al.
7,407,704 B2 *  8/2008 Kirsten ...................... C09J 9/00
                                                          428/323
(Continued)

FOREIGN PATENT DOCUMENTS

CN    1412265 A    4/2003
CN    1753598 A    3/2006
(Continued)

OTHER PUBLICATIONS

Machine translation of DE 10137713 A1 (Year: 2003).*
(Continued)

*Primary Examiner* — Vishal I Patel
(74) *Attorney, Agent, or Firm* — McDermott Will & Emery LLP

(57) ABSTRACT

The invention provides a method of dismantling an adhesion structure including a pair of adherends made of the same material or different materials and a dielectric adhesive sheet interposed between the pair of adherends and bonding the pair of adherends to each other. The method includes: a first step of heating the dielectric adhesive sheet by dielectric heating; and a second step of applying an external force to at least one of the pair of adherends or the dielectric adhesive sheet to separate the pair of adherends from the dielectric adhesive sheet.

10 Claims, 10 Drawing Sheets

(51) Int. Cl.
*C09D 187/00* (2006.01)
*C09J 5/06* (2006.01)
*C09J 11/04* (2006.01)

(52) U.S. Cl.
CPC .......... *C09J 11/04* (2013.01); *C09J 2301/502* (2020.08)

(56) References Cited

U.S. PATENT DOCUMENTS

| | | | |
|---|---|---|---|
| 2010/0129658 A1* | 5/2010 | Suzuki | B32B 27/36 428/411.1 |
| 2011/0073241 A1 | 3/2011 | Hase et al. | |
| 2013/0118692 A1* | 5/2013 | Miki | B32B 43/006 156/711 |
| 2015/0144271 A1 | 5/2015 | Fujita | |
| 2016/0053140 A1* | 2/2016 | Niwa | C09J 133/08 526/282 |
| 2017/0152404 A1* | 6/2017 | Niimi | C09J 133/06 |

FOREIGN PATENT DOCUMENTS

| | | | | |
|---|---|---|---|---|
| CN | 105073880 A | 11/2015 | | |
| DE | 10137713 A1 | 3/2003 | | |
| DE | 10137713 A1 * | 3/2003 | ........... | B29C 65/346 |
| DE | 102008062129 A1 | 6/2010 | | |
| EP | 0492786 A2 | 7/1992 | | |
| JP | H09-241599 A | 9/1997 | | |
| JP | H11-028706 A | 2/1999 | | |
| JP | 2004-000977 A | 1/2004 | | |
| JP | 2006-297271 A | 11/2006 | | |
| JP | 2010-121134 A | 6/2010 | | |
| JP | 2011-077138 A | 4/2011 | | |
| JP | 2013-166873 A | 8/2013 | | |
| JP | 2013-173913 A | 9/2013 | | |
| JP | 2013-206594 A | 10/2013 | | |
| JP | 2014-037489 A | 2/2014 | | |
| JP | 2015-101720 A | 6/2015 | | |
| JP | 6097914 B2 | 3/2017 | | |
| TW | 201026506 A | 7/2010 | | |
| TW | 201125018 A | 7/2011 | | |
| TW | 201323224 A | 6/2013 | | |
| TW | 201343851 A | 11/2013 | | |
| TW | 201529328 A | 8/2015 | | |
| TW | 201542747 A | 11/2015 | | |
| TW | 201607762 A | 3/2016 | | |
| TW | 201634556 A | 10/2016 | | |
| WO | 2011/027524 A1 | 3/2011 | | |
| WO | 2016/002763 A1 | 1/2016 | | |

OTHER PUBLICATIONS

Notice of Reasons for Rejection issued in corresponding Japanese Patent Application No. 2019-516276, dated May 28, 2019, with English translation.
Notice of Reasons for Rejection issued in corresponding Japanese Patent Application No. 2019-516276, dated Nov. 12, 2019, with English translation.
International Search Report issued in International Patent Application No. PCT/JP2018/029479, dated Sep. 18, 2018, with English translation.
Jianwen Xu et al, "Super High Dielectric Constant Carbon Black-Filled Polymer Composites as Integral Capacitor Dielectrics", Electronic Components and Technology Conference, 2004, vol. 1, Jun. 1, 2004, pp. 536-541.
Blackford D. B. et al., "Particle Size Analysis of Carbon Black", Particle and Particle Systems Characterization, vol. 4, No. 3, Sep. 1, 1987, pp. 112-117.
Extended European Search Report issued in corresponding European Patent Application No. 18845243.7-1102, dated Apr. 6, 2021.
Taiwanese Office Action issued in corresponding Taiwanese Patent Application No. 107127557, dated Dec. 17, 2021, with English translation.
Chinese Office Action issued in corresponding Chinese Patent Application No. 201880051570.X , dated May 14, 2021, with English translation.

* cited by examiner (A)　　　　　　　　　　　　(B)

(A)　　　　　　　　(B)　　　　　　　　(C)

(A)          (B)

METHOD FOR DISMANTLING ADHESIVE STRUCTURE

CROSS-REFERENCE OF RELATED APPLICATIONS

This application is the U.S. National Phase under 35 U.S.C. § 371 of International Patent Application No. PCT/JP2018/029479, filed on Aug. 6, 2018, which in turn claims the benefit of Japanese Application No. 2017-154769, filed on Aug. 9, 2017, the entire disclosures of which Applications are incorporated by reference herein.

TECHNICAL FIELD

The present invention relates to a method of dismantling an adhesion structure.

BACKGROUND ART

In recent years, a high-frequency dielectric heating has been known as a method of bonding a metallic door to an interior material in an automobile and bonding an FRP (Fiber Reinforced Plastic) structural member to a metallic door frame.

Patent Literature 1 discloses an adhesive layer composition (adhesive) that is provided by feeding a dielectric heating medium having a dielectric heating performance to an adhesive base having a compatibility with base materials to be bonded, in which a relative permittivity, a dielectric dissipation factor and the base materials are determined such that the adhesive layer composition satisfies a predetermined formula.

According to the technique of Patent Literature 1, adherends can be firmly bonded to each other.

CITATION LIST PATENT LITERATURE(S)

Patent Literature 1: JP Patent No. 6097914

SUMMARY OF THE INVENTION

Problem(s) to be Solved by the Invention

In recent years, industrial wastes are required to be disposed after being dismantled depending on materials. For instance, an automobile door is required to be separated into a metallic door member and a resin interior material for disposal.

Accordingly, since the adherends are firmly bonded to each other in Patent Literature 1, separation of the adherends is not easy.

An object of the invention is to provide a method of easily dismantling an adhesion structure, even in which adherends are firmly bonded to each other.

Means for Solving the Problem(s)

According to an aspect of the invention, a method of dismantling an adhesion structure including a pair of adherends that are made of the same material or different materials and a dielectric adhesive sheet that is interposed between the pair of adherends and bonds the pair of adherends to each other, the method includes: a first step of heating the dielectric adhesive sheet by dielectric heating; and a second step of applying an external force to at least one of the pair of adherends or the dielectric adhesive sheet to separate the pair of adherends from the dielectric adhesive sheet.

In the above arrangement, a shear force is applied to the pair of adherends along adhesive surfaces of the pair of adherends in the second step.

In the above arrangement, an out-of-plane directional force is applied to the pair of adherends along adhesive surfaces of the pair of adherends in the second step.

In the above arrangement, a wire is inserted between the dielectric adhesive sheet and one of the pair of adherends and is moved along an adhesive surface of the one of the pair of adherends in the second step.

In the above arrangement, a peeling force is applied to one of the pair of adherends in the second step.

In the above arrangement, a suction force is applied to one of the pair of adherends in the second step.

In the above arrangement, a gap is formed in at least one of the pair of adherends, extending along an adhesive surface of the at least one of the pair of adherends, and, in the second step, an out-of-plane directional force is applied through the gap of the at least one of the pair of adherends.

With this arrangement, the pair of adherends can be separated by heating the dielectric adhesive sheet by the dielectric heating in the first step and applying an external force to at least one of the pair of adherends or the dielectric adhesive sheet in the second step. Accordingly, the pair of adherends of the firmly bonded adhesion structure can be easily separated.

In the above arrangement, it is preferable that, in the first step, a one-side high-frequency dielectric heater, which includes an electrode unit whose opposing electrodes are provided at one side of the one-side high-frequency dielectric heater, is disposed at one of the dielectric adhesive sheet and the pair of adherends, and a high-frequency voltage at a frequency in a range from 1 MHz to 200 MHz and at an output in a range from 0.05 kW to 50 kW is applied for 1 second to 180 seconds to perform dielectric heating.

With this arrangement, the pair of adherends can be separated by using the one-side high-frequency dielectric heater without holding the adhesion structure between electrodes. Accordingly, the pair of adherends can be easily separated by applying the high-frequency voltage to one side of the adhesion structure.

Moreover, since the dielectric adhesive sheet can be sufficiently heated by applying the high-frequency voltage for 1 second to 80 seconds, the pair of adherends can be separated with less force.

In the above arrangement, it is preferable that the dielectric adhesive sheet includes a thermoplastic resin and a dielectric filler, and a content of the dielectric filler is in range from 5 parts by mass to 800 parts by mass with respect to the thermoplastic resin of 100 parts by mass.

With this arrangement, since the dielectric adhesive sheet contains the thermoplastic resin and the dielectric filler, the once solidified dielectric adhesive sheet can be easily heated. Moreover, at the content of the dielectric filler in a range from 5 parts by mass to 800 parts by mass, the dielectric adhesive sheet can be easily heated to a high temperature by high-frequency electric heating.

According to another aspect of the invention, a method of dismantling an adhesion structure including a dielectric adhesive sheet, on a surface of which a sheet-shaped base material is laminated, and an adherend bonded to the dielectric adhesive sheet, the method includes: a first step of heating the dielectric adhesive sheet by dielectric heating;

and a second step of applying an external force to the dielectric adhesive sheet to separate the dielectric adhesive sheet from the adherend.

Herein, various materials and layer structures are applicable to the sheet-shaped base material. For instance, the sheet-shaped base material may be in a form of a single layer or may be in a form of a laminate of a plurality of function layers.

Also according to the aspect of the invention, the same functions and effects as described above can be obtained.

BRIEF DESCRIPTION OF DRAWING(S)

DESCRIPTION OF EMBODIMENT(S)

Exemplary embodiments of the invention will be described below.

[1] Structure of Adhesion Structure 1

Figure 1:
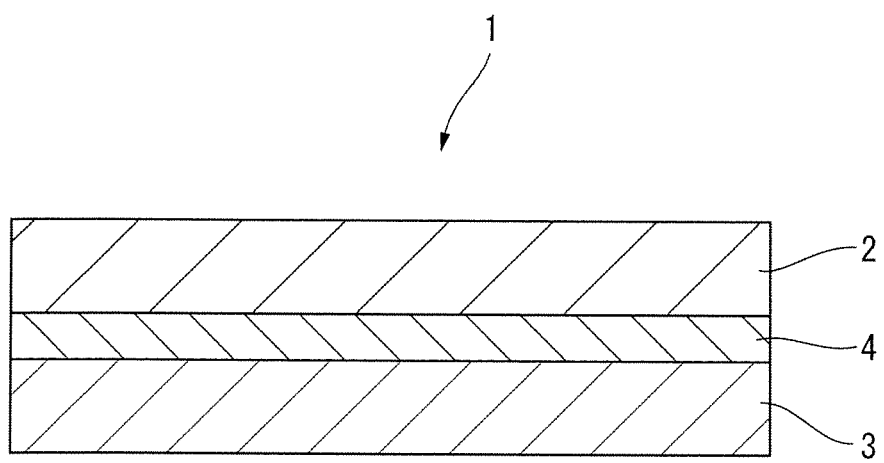
FIG. 1 is a cross-sectional view showing an adhesion structure according to an exemplary embodiment of the invention.

FIG. 1 shows a structure of an adhesion structure 1 according to an exemplary embodiment of the invention. The adhesion structure 1 includes a pair of adherends 2, 3 and a dielectric adhesive sheet 4 interposed between the pair of adherends 2, 3, in which the pair of adherends 2, 3 are firmly bonded to each other by the dielectric adhesive sheet 4.

Such an adhesion structure 1 is used, for instance, in an automobile when an interior surface of a roof and a resin lining material are bonded to each other, and when a metallic door panel and a resin door trim material are bonded to each other. The pair of adherends 2, 3 are optionally selectable from any materials such as metallic material (e.g., iron and aluminum), plastic material (e.g., FRP), and inorganic material (e.g., concrete and mortar). The adherend 2 and the adherend 3 may be the same material or different materials.

The dielectric adhesive sheet 4 is a high-frequency dielectric adhesive sheet for bonding the pair of adherends 2, 3, and is in a form of a high-frequency dielectric adhesive layer as shown in FIG. 1.

[1-1] Dielectric Adhesive Sheet 4

The dielectric adhesive sheet 4 contains a thermoplastic resin and a dielectric filler.

The thermoplastic resin contained in the dielectric adhesive sheet 4, whose type is not limited, is, for instance, preferably at least one of a polyolefin resin, a polyolefin resin, a modified polyolefin resin, an olefin thermoplastic elastomer, a styrene thermoplastic elastomer, a polyamide resin, a polyvinyl acetate resin, a polyacetal resin, a polycarbonate resin, a polyacryl resin, a polyamide resin, a polyimide resin, a polyvinyl acetate resin, a phenoxy resin and a polyester resin, which are easily melted and exhibit a predetermined heat resistance.

More specifically, examples of the polyolefin resin include one of or a combination of resins selected from a homopolymer resin such as polyethylene, polypropylene, polybutene and polymethylpentene, and α-olefin resin of a copolymer of ethylene, propylene, butene, hexene, octene, and 4-methylpentene. Among the polyolefin resin, polypropylene resin is especially preferable in view of easy adjustability in melting point or softening point, low cost and excellent mechanical strength and transparency thereof.

It should be noted that permittivity at 1 MHz (hereinafter, referred to as ε'/1 MHz) of the polypropylene resin used in the invention is preferably in a range from 2.2 to 2.6, dielectric dissipation factor at 1 MHz (hereinafter, referred to as tan δ/1 MHz) of the polypropylene resin is preferably in a range from 0.0005 to 0.0018, and a loss factor of the polypropylene resin is preferably approximately 0.0047.

When a crystalline polyester resin is used, permittivity (ε'/1 MHz) of the crystalline polyester resin is preferably in a range from 2.8 to 4.1, a dielectric dissipation factor (tan δ/1 MHz) of the crystalline polyester resin is preferably in a range from 0.005 to 0.026, and a loss factor of the crystalline polyester resin is preferably in a range from 0.0168 to 0.11.

The dielectric dissipation factor (tan δ) and permittivity (ε') as the dielectric property of the dielectric adhesive sheet 4, which may be measured in accordance with JIS C 2138:2007, can be easily and accurately measured in accordance with impedance material method.

The dielectric property (tan δ/ε'), which is obtained by dividing the dielectric dissipation factor (tan δ) measured with an impedance material analyzer or the like by permittivity (ε') measured in the same manner, is preferably 0.005 or more.

This is because, when the dielectric property is less than 0.005, the dielectric adhesive sheet does not generate heat as desired through the dielectric heating irrespective of the type of the adhesive component and the like, sometimes making it difficult to firmly bond the adherends to each other.

However, when the value of the dielectric property is excessively large, it sometimes occurs that the types of a usable adhesive component and a dielectric filler are excessively limited and/or total light transmissivity is rapidly decreased.

Accordingly, the dielectric property of the dielectric adhesive sheet is more preferably in a range from 0.008 to 0.05, further preferably in a range from 0.01 to 0.03. It should be noted that the measurement method of the dielectric property of the dielectric adhesive sheet will be detailed below in later-described Example 1.

A melting point or a softening point of the thermoplastic resin contained in the dielectric adhesive sheet 4 is preferably at a value in a range from 80 to 200 degrees C.

Specifically, such a crystalline thermoplastic resin, whose melting point (i.e. a temperature at which a crystalline portion is melted) measured by a differential scanning calorimeter (DSC) or the like is defined within a predetermined range, can achieve a favorable balance between heat resistance in use environments and the like and weldability during the dielectric heating.

More specifically, the melting point may be determined using a differential scanning calorimeter by: raising a temperature of 10 mg measurement sample (thermoplastic resin) to 250 degrees C.; cooling the measurement sample to 25 degrees C. at a temperature-decrease rate of 10 degrees C./min to crystallize the measurement sample; again heating the measurement sample at a temperature-increase rate of 10 degrees C./min to re-melt the sample; and measuring a peak temperature of a melting peak observed on a DSC chart (fusion curve) when the sample is re-melted.

An amorphous thermoplastic resin, whose softening point (glass transition point) (i.e. a temperature at which an amorphous portion is melted) measured in accordance with a ring-and-ball method or the like is defined within a predetermined range, can also achieve a favorable balance between heat resistance and weldability during the dielectric heating.

More specifically, the softening point of the thermoplastic resin can be measured in accordance with JIS K 6863 (1994).

In either case, when the melting point or the softening point of the thermoplastic resin falls below 80 degrees C., the heat resistance may become so insufficient that an intended use of the dielectric adhesive sheet 4 may be excessively limited and/or mechanical strength may be significantly reduced.

On the other hand, when the melting point or the softening point of the thermoplastic resin exceeds 200 degrees C., welding of the dielectric adhesive sheet 4 through the dielectric heating may take an excessively long time and/or the adhesive force may be excessively decreased.

The melting point or softening point of the thermoplastic resin is thus more preferably in a range from 100 to 190 degrees C., further preferably from 120 to 180 degrees C.

It should be noted that, although the above-mentioned melting point or softening point of the thermoplastic resin is preferably obtained by measuring solely the thermoplastic resin contained in the dielectric adhesive sheet 4, practically, the melting point or softening point of the dielectric adhesive sheet 4 is measured as described later and can be estimated as the melting point or softening point of the thermoplastic resin.

The average molecular weight (weight average molecular weight) of the thermoplastic resin is usually preferably in a range from 5000 to 300000.

This is because, when the weight average molecular weight of the thermoplastic resin falls below 5000, the heat resistance and/or the adhesion strength may be significantly reduced.

On the other hand, when the weight average molecular weight of the thermoplastic resin exceeds 300000, the weldability and the like in the dielectric heating may be significantly reduced.

The weight average molecular weight of the thermoplastic resin is thus more preferably in a range from 10000 to 200000, further preferably from 30000 to 100000.

It should be noted that the weight average molecular weight of the thermoplastic resin can be measured through, for instance, intrinsic viscosity method or gel permeation chromatography (GPC) in accordance with JIS K 7367-3 (1999).

The melt flow rate (MFR) of the thermoplastic resin is usually preferably in a range from 1 g/10 min to 300 g/10 min at 230 degrees C. under 2.16 kg load, though depending on the weight average molecular weight.

When the MFR is 1 g/10 min or more, the heat resistance at the adhered portion is relatively improved.

On the other hand, at the MFR of 300 g/10 min or less, the adhesion time through the dielectric heating can be reduced and stable adhesiveness can be obtained.

The MFR is thus more preferably in a range from 1 g/10 min to 100 g/10 min, further preferably from 1 g/10 min to 50 g/10 min.

It should be noted that the value of the MFR can be measured in accordance with JIS K 7210-1 (2014) at 230 degrees C. under 2.16 kg load.

The above-mentioned thermoplastic resin also preferably contains a combination of a plurality of thermoplastic resins.

For instance, the above-mentioned thermoplastic resin preferably contains a combination of a first component that is a first thermoplastic resin having a predetermined solubility parameter ($\delta1$) and a second component that is a second thermoplastic resin having a solubility parameter ($\delta2$) larger than the solubility parameter ($\delta1$) of the first thermoplastic resin.

In other words, as long as the dielectric adhesive sheet 4 at least contains the first component, the second component and the dielectric filler, the dielectric adhesive sheet 4 can be favorably bonded to various adherends even through dielectric heating for a shorter time.

Further, the storage modulus (E') of the dielectric adhesive sheet 4 can be easily controlled, so that handleability and flexibility of a high-frequency dielectric adhesive sheet can be improved.

Accordingly, the dielectric adhesive sheet 4 can be easily formed into an elongated roll, even without a release sheet.

The type of the dielectric filler is not limited as long as the dielectric filler is a high-frequency wave absorbing filler having a high dielectric loss factor enough to generate heat when a high-frequency wave of, for instance, a frequency of 28 MHz or 40 MHz is applied.

The dielectric filler preferably is a single one of or a combination of two or more of compounds selected from zinc oxide, silicon carbide (SiC), anatase-type titanium oxide, barium titanate, barium zirconate titanate, lead titanate, potassium niobate, rutile-type titanium oxide, hydrated aluminum silicate, inorganic substance having crystallization water such as hydrated aluminosilicate salt of alkali metal or alkaline earth metal, and the like.

Among the above, zinc oxide and silicon carbide, which include various types, provide a wide selection of shapes and sizes, allow modification of welding and mechanical properties of the dielectric adhesive film depending on the intended use, and are capable of generating a lot of heat in a relatively small amount, are especially preferable as the dielectric filler.

A content of the dielectric filler is preferably at a value in range from 5 parts by mass to 800 parts by mass with respect to the thermoplastic resin of 100 parts by mass.

This is because, when the content of the dielectric filler becomes excessively small, heat-generating performance may become poor even when the dielectric adhesive sheet is subjected to the dielectric heating, so that meltability of the thermoplastic resin may be excessively decreased, failing to provide strong bonding.

On the other hand, an excessively large content of the dielectric filler may excessively lower fluidity of the high-frequency dielectric adhesive sheet during the dielectric heating.

The content of the dielectric filler is thus preferably in a range from 30 parts by mass to 500 parts by mass with respect to the thermoplastic resin of 100 parts by mass, more preferably in a range from 50 parts by mass to 300 parts by mass.

A mean particle size (median diameter: D50) of the dielectric filler measured in accordance with JIS Z 8819-2 (2001) is preferably in a range from 0.1 μm to 30 μm.

This is because, when the mean particle size is less than 0.1 μm, polarizable distance inside the filler is reduced so that the filler is less polarized, though depending on the type of the filler.

Inversion motion caused when high-frequency wave is applied is thus attenuated to cause excessive decrease in the dielectric heating performance, possibly making it difficult to achieve tight adhesion between adherends.

In contrast, as the mean particle size increases, the filler is more polarized because of the increase in the polarizable distance inside the filler, so that the inversion motion caused when a high-frequency wave is applied is intensified, thereby improving the dielectric heating performance.

However, when the mean particle size exceeds 30 μm, the distance between neighboring dielectric fillers becomes short and the inversion motion caused when a high-frequency wave is applied is attenuated due to electric charge of the neighboring dielectric fillers, so that the dielectric heating performance may be excessively reduced and the adherends may be less tightly bonded to each other.

The mean particle size of the dielectric filler is thus more preferably in a range from 1 μm to 30 μm, further preferably from 2 μm to 25 μm, most preferably from 3 μm to 20 μm.

[1-2] Manufacturing Method of Adhesion Structure 1

The adhesion structure 1 can be manufactured through the following steps.

Firstly, in a holding step, the dielectric adhesive sheet 4 is disposed at a predetermined position, where the dielectric adhesive sheet 4 is held between the pair of adherends 2, 3 made of the same material or different materials.

At this time, it is usually preferable to hold the dielectric adhesive sheet 4 between the pair of adherends 2, 3 after the dielectric adhesive sheet 4 is cut into pieces of a predetermined shape.

Moreover, it is also preferable, in order to locate the dielectric adhesive sheet 4 at a correct position without a position gap, to provide a sticky portion all over or on a part of one side or both sides of the dielectric adhesive sheet 4, and/or to provide a temporary fixing hole or projection on a part of the dielectric adhesive sheet 4.

The material(s) usable for the adherends 2, 3 is not limited but may be an organic material, an inorganic material (including metal material) or a composite of the organic and inorganic materials.

Examples of the organic material include a plastic material such as polypropylene resin, polyethylene resin, acrylonitrile-butadiene-styrene copolymer resin (ABS resin), polycarbonate resin (PC resin), polyamide resin (e.g. Nylon 6, Nylon 66), polyethylene terephthalate resin (PET resin), polybutylene terephthalate resin (PBT resin), polyacetal resin (POM resin), polymethyl methacrylate resin, polystyrene resin and urethane resin, and a rubber material such as styrene-butadiene rubber (SBR), ethylene propylene rubber (EPR) and silicone rubber. The adherends 2, 3 also may be a foam of the above plastic material and rubber material.

Examples of the inorganic material include glass material, ceramic material and metal material. A fiber-reinforced resin (FRP), which is a composite of glass fiber and the above plastic material, is also preferable as the inorganic material.

A fiber-reinforced resin (FRP), which is a composite of glass fiber and the above plastic material, is also preferable as the material of the adherends 2, 3.

The pair of adherends 2, 3 made of the above materials may be a combination of the same material or different materials.

Figure 6:
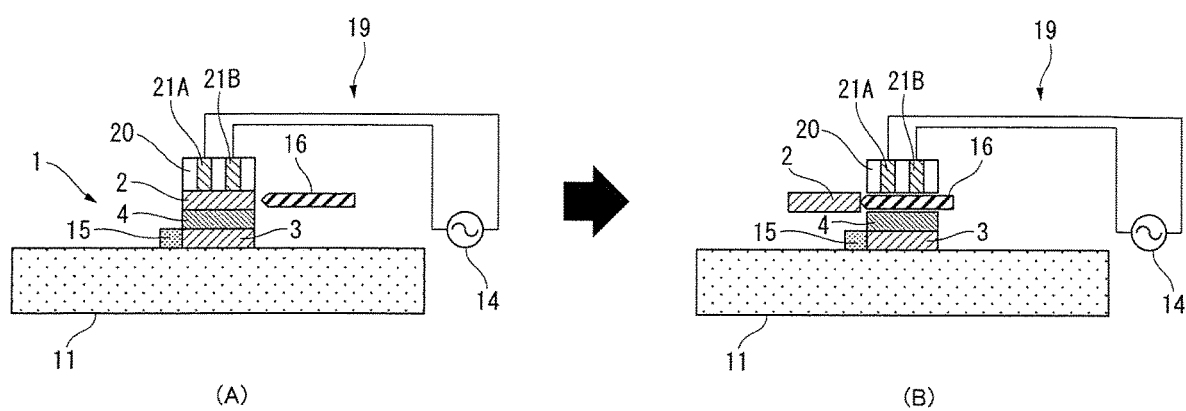
FIG. 6 is a schematic illustration showing a dismantling method of an adhesion structure in a third exemplary embodiment of the invention.

With use of the pair of adherends made of a combination of different materials, when a high frequency wave is applied using a one-side voltage-applying device as shown in FIG. 6, an adhesive force of the dielectric adhesive sheet 4 to a material having a small polarity sometimes becomes insufficient.

In order to avoid the shortage in the adhesive force, when the one-side voltage-applying device is used for applying a high frequency wave, it is preferable that a first one of the adherends whose a material has a smaller polarity is disposed close to an electrode unit, and a second one of the adherends whose material has a larger polarity is disposed opposite the first adherend.

Specifically, it is expected that a closer one of surfaces of the dielectric adhesive sheet 4 to the electrode unit has a lower melt viscosity or is exposed to a longer melt time due to more dielectric loss, thereby providing a favorable wettability to the adherend to improve adhesivity.

It should be noted that the polarity of each of the adherends 2, 3 can be identified by solubility parameter (SP value) of the material of each of the adherends 2, 3.

When the adherend 2 or the adherend 3 is made of a conductive material (e.g., metal material) and the adherend made of the conductive material is disposed on a side of the dielectric adhesive sheet 4 close to the electrode unit, the high frequency wave is sometimes blocked to make it difficult to melt the dielectric adhesive sheet 4.

Accordingly, the conductive adherend is disposed to an opposite side of the dielectric adhesive sheet 4 from the electrode unit, allowing the one-side voltage-applying device to apply a high-frequency wave to the dielectric adhesive sheet 4, whereby an effective bonding through dielectric heating is achievable.

Specifically, when the adherends 2, 3 are made of a combination of a metal material and a non-metal material, the adherends 2, 3 and the dielectric adhesive sheet 4 can be firmly bonded to each other with the adherend 2 being a non-metal material and the adherend 3 being a metal material.

It should be noted that, when a double-side voltage-applying device is used with a metal material for the adherend(s), electric sparks are generated irrespective of the combination and the arrangement of the adherends. Hence, a high-frequency wave cannot be applied.

Next, in an electrode disposition step, an electrode unit is disposed on one or both of the adherends 2, 3.

Specifically, TECNOIRON-400T, TECNOGAN-400T (both manufactured by YAMAMOTO VINITA CO., LTD) and the like are usable as a commercially available one-side voltage-applying device.

Moreover, in addition to the one-side voltage-applying device, a double-side voltage-applying high-frequency dielectric heater (YRP-400T-A manufactured by YAMA- MOTO VINITA CO., LTD) with electrodes holding the adherends 2, 3 therebetween is usable.

Further, in a heating step, the electrode unit of the high-frequency dielectric heater is activated to apply a high-frequency wave, thereby dielectrically heating the dielectric adhesive sheet 4 to melt, so that the pair of adherends 2, 3 are mutually bonded through the dielectric adhesive sheet 4.

High-frequency dielectric heating conditions of the high-frequency dielectric heater are not particularly limited as long as a predetermined adhesion structure 1 is obtainable. It is usually preferable to bond an adhesive film to the adherends under conditions of a high-frequency output in a range from 0.05 kW to 50 kW and an application time in a range from 1 second to less than 80 seconds.

The high-frequency output is determined herein within the range from 0.05 kW to 50 kW because the dielectric heating at the high-frequency output less than 0.05 kW is unlikely to increase a temperature of the dielectric adhesive sheet 4 to fail to provide a favorable adhesive force.

On the other hand, at the high-frequency output exceeding 50 kW, a temperature control by the dielectric heating becomes sometimes difficult.

The application time is determined in a range from 1 second to less than 80 seconds because the dielectric heating for the application time less than 1 second of a high-frequency wave is unlikely to increase the temperature of the dielectric adhesive sheet 4 to fail to provide a favorable adhesive force.

On the other hand, at the application time of 80 seconds or more, a production time becomes sometimes excessively long to decrease a production efficiency or increase a production cost, and further thermally degrade the adherends. The application time is more preferably less than 40 seconds.

The high-frequency output is thus more preferably at a value in a range from 1 kW to 20 kW, further preferably from 1 kW to 15 kW.

For the application of the high-frequency wave, a pressure treatment is preferably performed usually by a manual operation. The pressure treatment is also preferably added when the adhesion after the application of the dielectric heating is still insufficient.

Specifically, it is preferable to press the pair of adherends 2, 3 in a direction for the adherends 2, 3 to be sandwiched, alternatively, in a direction to press one of the adherends 2, 3 toward the other thereof.

In such a case, a pressing force at the application of the high-frequency wave is usually preferably at a value in a range from 0.1 N/cm² to 10 N/cm², more preferably in a range from 1 N/cm² to 5 N/cm², further preferably in a range from 2 N/cm² to 4 N/cm².

[2] Other Adhesion Structures 5, 5A

Figure 2:
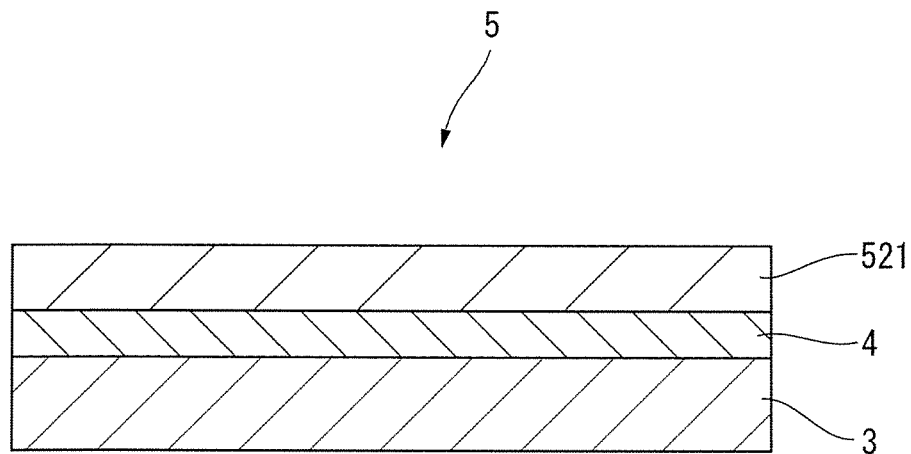
FIG. 2 is a cross-sectional view showing an adhesion structure according to another exemplary embodiment of the invention.

FIG. 2 shows a structure of another adhesion structure 5. The adhesion structure 5 has a structure in which one of the adherends is a sheet-shaped base material 521 and the sheet-shaped base material 521 is bonded to the other adherend 3 through the dielectric adhesive sheet 4. The sheet-shaped base material 521 and the dielectric adhesive sheet 4 are sometimes handled as an integrated adhesive sheet.

The sheet-shaped base material 521 is exemplified by a paper base material such as a high quality paper, art paper, coated paper, kraft paper, glassine paper and impregnated paper.

Moreover, the sheet-shaped base material 521 may be a synthetic paper. Such a synthetic paper advantageously has more excellent water resistance than the paper base material and has more excellent printability than a usual resin film. As the synthetic paper, for instance, a cavity-containing synthetic paper (for instance, product name: CRISPER (manufactured by Toyobo Co., Ltd.)), a synthetic paper by internal papermaking method (for instance, product name: YUPO (manufactured by YUPO CORPORATION), a synthetic paper by a surface coating method (for instance, product name: PEACH COAT (manufactured by Nisshinbo Industries Inc.), and a synthetic paper by spunbond method (for instance, product name: TYVEK (manufactured by DuPont de Nemours, Inc.) are commercially available and suitably usable.

Further, the sheet-shaped base material 521 is preferably a single one or a combination of two or more resin films, examples of which include a polyvinyl chloride resin film (sometimes containing a plasticizer), polyolefin resin film (including polyethylene resin film, cycloolefin resin film, and norbornene resin film), polyester resin (including a polyethylene terephthalate resin film, polybutylene naphthalate resin film, polyethylene naphthalate resin film and the like), acrylic resin film, polyamide resin film, polyurethane resin film, silicone resin film, triacetylcellulose resin film, polystyrene resin film, polyvinyl alcohol resin film, ABS resin film, polycarbonate resin film, polyacetal resin film, and rayon resin film.

Additionally, as modifications of the above resin film, the base material of a foam resin type, examples of which include a polyester foam resin film, urethane foam resin film, and polystyrene foam resin film, is also suitably usable.

Further, the sheet-shaped base material 521 may be cloth fabrics such as a woven fabric, an unwoven fabric, or a metal foil such as an aluminum foil, a stainless steel foil, and a copper foil.

When the sheet-shaped base material 521 is a conductive material such as a metal foil, a high-frequency wave is applied from a side of an adherend, not from a side of the sheet-shaped base material 521. In other words, the dielectric adhesive sheet 4 is interposed between the conductive sheet-shaped base material 521 and a high-frequency application device, so that the dielectric adhesive sheet 4 can be heated.

The above-described sheet-shaped base material 521 may be in a form of a single base material made of a single constituent material or in a form of a composite base material provided by layering two or more different layers.

A thickness of the sheet-shaped base material 521 is usually preferably a value in a range from 10 μm to 1000 μm.

This is because a mechanical strength may be drastically decreased or handleability may be deteriorated when the thickness of the sheet-shaped base material 521 is a value less than 10 μm.

On the other hand, when the thickness of the sheet-shaped base material 521 is a value more than 1000 μm, it may be difficult to wind the sheet-shaped base material 521 into a roll.

Accordingly, although depending on usage and the like of the dielectric adhesive sheet 4, the thickness of the sheet-shaped base material 521 is usually more preferably a value in a range from 20 μm to 800 μm, further preferably from 30 μm to 500 μm, most preferably from 40 μm to 300 μm.

The adhesive sheet in which the sheet-shaped base material 521 and the dielectric adhesive sheet 4 are integrated is sometimes used for a print label, a decorative material of a construction material or marking of a signboard and the like.

Accordingly, examples of the adhesion structure 5 include a labeled object, a decorated construction material and a signboard with marking.

Figure 3:
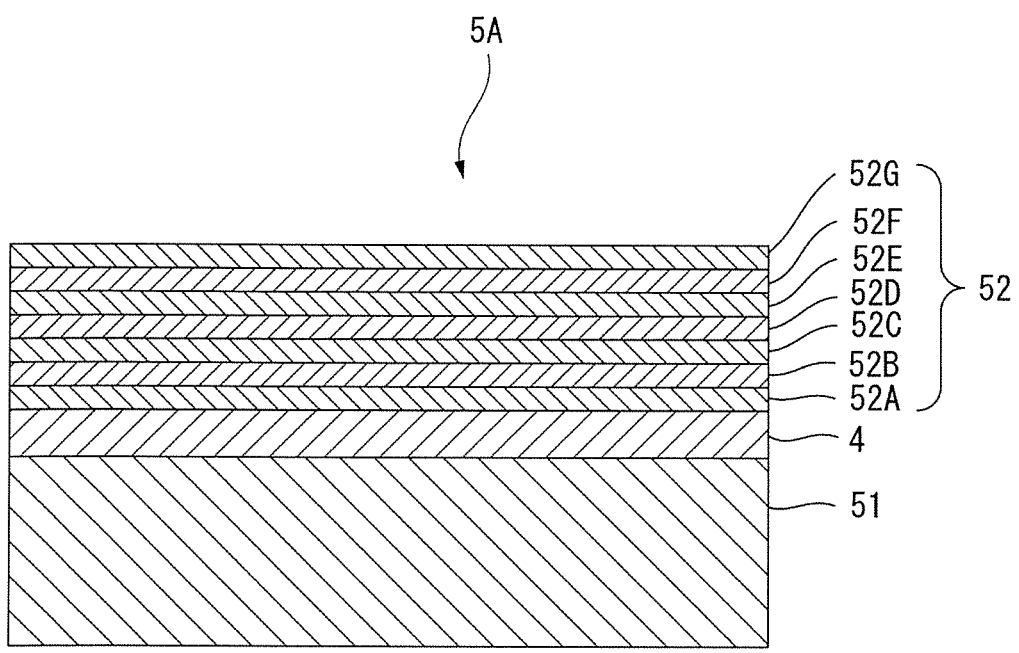
FIG. 3 is a cross-sectional view showing an adhesion structure according to still another exemplary embodiment of the invention.

Moreover, an adhesion structure 5A with an adhesive sheet used for marking includes a floor marking sheet 52 and the other adherend in a form of a road surface or a floor material as shown in FIG. 3.

The floor marking sheet 52 is laminated on an upper surface of the dielectric adhesive sheet 4 and is integrated with the dielectric adhesive sheet 4. The floor marking sheet 52 includes an interlayer adhesive layer 52A, a sheet-shaped base material 52B, an interlayer adhesive layer 52C, an accepting layer 52D, a decorative layer 52E, an interlayer adhesive layer 52F, and a surface protection layer 52G, which are sequentially laminated on the dielectric adhesive sheet 4. When the adhesion structure 5A is intended to be used for marking with the floor marking sheet 52, the other adherend 51 is exemplified by a floor plate (e.g., concrete and mortar) and a road surface (e.g., asphalt). The arrangement of the floor marking sheet 52 is not limited to the above. Any materials, layer arrangements and the like are employable.

Any materials suitable for the intended use are usable as a material of each of layers of the floor marking sheet 52.

Specifically, the interlayer adhesive layer 52A between the sheet-shaped base material 52B and the dielectric adhesive sheet 4, and the interlayer adhesive layer 52C between the sheet-shaped base material 52B and the accepting layer 52D are preferably a thermoplastic adhesive, a thermosetting adhesive, a pressure-sensitive adhesive and the like.

Specifically, preferably, the thermosetting adhesive and the pressure-sensitive adhesive is supplied in a form of a coating liquid in which a component of the adhesive is dissolved or dispersed in water or an organic solvent, and the coating liquid is applied and dried to form a laminate of two layers, thereby providing the interlayer adhesive layers 52A, 52C.

Moreover, the thermoplastic adhesive may be extruded into a film, or may be dissolved or dispersed in an organic solvent or the like to provide a coating liquid and the coating liquid may be applied and dried to provide the interlayer adhesive layer.

The interlayer adhesive layer 52F provided between the surface protection layer 52G and the decorative layer 52E is preferably formed of a transparent pressure-sensitive adhesive (e.g., with light transmissivity of 80% or more) in order to securely visually check the decorative layer 52E.

Moreover, any resin having a sufficient adhesion strength is usable as the thermoplastic resin for forming the interlayer adhesive layers 52A, 52C, 52F.

Specific examples of the thermoplastic resin include an ethylene vinyl acetate copolymer, ethylene(meth)acrylic acid copolymer, ethylene(meth)acrylic acid ester copolymer, ionomer resin, and chlorinated polyolefin resin.

Specific examples of the thermosetting resin used for the interlayer adhesive layers 52A, 52C, 52F include a polyester resin, polyurethane resin, epoxy resin, acrylic resin, and phenol resin.

Specific examples of the pressure-sensitive adhesive used for the interlayer adhesive layers 52A, 52C, 52F include an acrylic adhesive, rubber adhesive, silicone adhesive, urethane adhesive, and vinyl ether adhesive.

A thickness of each of the interlayer adhesive layers 52A, 52C, 52F, which is not particularly limited, may be determined as needed in consideration of components of the interlayer adhesive layers 52A, 52C, 52F and types of layers adjacently sandwiching each of the interlayer adhesive layers 52A, 52C, 52F. The interlayer adhesive layers 52A, 52C, 52F may be the same or different in thickness.

Accordingly, the thickness of each of the interlayer adhesive layers 52A, 52C, 52F is usually preferably a value in a range from 1 μm to 50 μm.

Next, a material and a thickness of the sheet-shaped base material 52B can be the same as those of the sheet-shaped base material 521 exemplarily shown in FIG. 2.

When the adhesion structure 5 is used for printed matters such as a printed label, a building material as a decorative material, or a marking material (e.g., signboard), the adhesion structure 5 also preferably has an accepting layer 52D on a surface (i.e., an opposite surface from the dielectric adhesive sheet 4) of the sheet-shaped base material 52B.

This is because the accepting layer 52D thus provided on the sheet-shaped base material 52B allows the high-frequency dielectric heating adhesive sheet to be used for the above-described printed matters even when the sheet-shaped base material 52B has an insufficient printability.

Herein, a material forming the accepting layer 52D is not particularly limited, but any material may be selected as needed in consideration of the material of the sheet-shaped base material 52B, ink used for printing, a printing method, and properties of a decorative layer 52E formed on the accepting layer 52D.

Specifically, a coating agent, in which an additive (e.g., a filler, pigment, dye, curing agent and coupling agent) and a solvent are blended, is used with a binder in a form of a thermoplastic resin or a thermosetting resin such as a polyester resin, polyurethane resin, and acrylic resin, thereby being applied to the sheet-shaped base material 52B and being dried to provide the accepting layer 52D.

For instance, when the decorative layer 52E is an ink-jet layer, provision of the accepting layer 52D formed of a polyvinyl alcohol resin, polyvinyl acetal resin or the like can prevent an ink-jet coating material from being repelled and the like, so that a stable and strong decorative layer 52E can be formed.

A thickness of the accepting layer 52D, which is not particularly limited, may be determined as needed in consideration of types of ink used for printing, a printing method and the like.

Accordingly, the thickness of the accepting layer 52D is usually preferably in a range from 1 μm to 10 μm.

Further, the decorative layer 52E, which is in a form of a letter, figure, sign, design, illustration and the like, provides predetermined information to a viewer and gives decoration to the adherend 51. Although the decorative layer 52E is usually a printed layer formed of a predetermined coating material, the decorative layer 52E may be an embossed layer.

Specifically, the decorative layer 52E is a gravure printing layer, ink-jet layer, intaglio printing layer or embossed layer, which is formed of a coating material containing various coloring agents in various resins such as a urethane resin, acrylic resin, vinyl chloride resin, and silicone resin.

A method of forming the decorative layer 52E in a form of the printed layer may be selected from known methods such as relief printing, intaglio printing, planographic printing, gravure printing, flexo printing, thermal transfer printing, ink-jet printing, and electrostatic printing (toner printing), and embossing technique such as emboss roll processing.

A thickness of the decorative layer 52E, which is not particularly limited, may be determined as needed in consideration of types of ink used for printing, a printing method and the like.

Accordingly, the thickness of the decorative layer 52E is usually preferably in a range from 1 μm to 10 μm.

Moreover, the surface protection layer 52G preferably has sufficient light transmission characteristics (e.g., light transmissibility of 80% or more) in order to keep visibility of the decorative layer 52E.

Further, in order to modify an appearance of the decorative layer 52E to be glossy, matted or the like, a surface of the surface protection layer 52G may be smooth or uneven (matted).

A material of the surface protection layer 52G is preferably a transparent resin film. Specifically, a transparent film exemplified by a polypropylene film and a polyethylene terephthalate film and having a strength increased by drawing is preferable.

Moreover, the surface protection layer 52G used for a floor marking sheet described later is preferably a transparent polyvinyl chloride film whose surface is matted in order to produce a non-skid effect and a light-scattering effect.

A thickness of the surface protection layer 52G, which is not particularly limited, may be determined as needed in consideration of the intended use of the dielectric adhesive sheet 4 and environments under which the dielectric adhesive sheet 4 is used.

Accordingly, a thickness of the surface protection layer 52G is usually preferably at a value in a range from 5 μm to 100 μm.

[3] First Exemplary Embodiment

Next, a dismantling method of the above adhesion structure 1 will be described.

Figure 4:
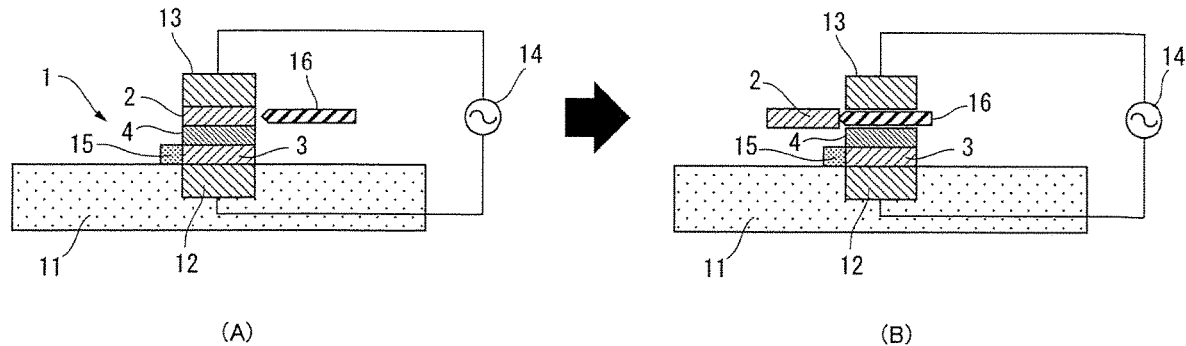
FIG. 4 is a schematic illustration showing a dismantling method of an adhesion structure in a first exemplary embodiment of the invention.

FIG. 4 shows the dismantling method of the adhesion structure 1 according to a first exemplary embodiment of the invention. FIG. 4(A) illustrates a first step. FIG. 4(B) illustrates a second step.

The adhesion structure 1 is disposed on a base 11. A lower electrode 12 is disposed in the base 11 just below the adhesion structure 1. An upper electrode 13, which is movable up and down, is disposed just above the adhesion structure 1. A high-frequency alternating power source 14 is connected to the lower electrode 12 and the upper electrode 13 via a wire.

The base 11 is provided with a fixed member 15 in contact with the adherend 3. A pressing member 16 is configured to be brought into contact with the adherend 2.

In the first step, as shown in FIG. 4(A), the adherend 3 is disposed on an upper surface of the lower electrode 12 and the upper electrode 13 is disposed on or above an upper surface of the adherend 2. When the high-frequency alternating power source 14 is turned on, a high-frequency voltage is applied to between the lower electrode 12 and the upper electrode 13 to heat the dielectric adhesive sheet 4. A frequency of the high-frequency voltage at this time ranges from 1 MHz to 200 MHz, specifically, 13.56 MHz, 27.12 MHz, 40.68 MHz and the like which are determined by an ISM band. An output of the high-frequency voltage ranges from 0.05 kW to 50 kW. Although depending on the thickness, the material and the like of the adhesion structure 1, the high-frequency voltage is preferably applied for a time from 1 second to 180 seconds, more preferably 3 seconds to 120 seconds.

The high-frequency output is determined herein within the range from 0.05 kW to 50 kW because the dielectric heating at the high-frequency output less than 0.05 kW is unlikely to increase a temperature of the dielectric adhesive sheet 4 and soften the dielectric adhesive sheet 4.

On the other hand, at the high-frequency output exceeding 50 kW, a temperature control by the dielectric heating becomes sometimes difficult.

The high-frequency output is more preferably in a range from 0.1 kW to 20 kW.

After the first step in which the dielectric adhesive sheet 4 is heated, the second step in which the pressing member 16 is pressed along an adhesive surface of the adherend 2 is performed.

The second step is preferably performed at a timing when the dielectric adhesive sheet 4 is in a heated state, most preferably at a timing when an application of the high-frequency wave has been started and continued. The second most preferably, the second step is performed immediately after the upper electrode 13 is removed at the end of the application of the high-frequency wave so as not to disturb the second step, and before the dielectric adhesive sheet 4 is cooled.

While the fixed member 15 fixes a first side of the adherend 3, the pressing member 16 press a second side of the adherend 2 opposite the first side. Accordingly, a shear force acts on along the adhesive surface of the adherend 2, so that the adherend 2 is removed from the dielectric adhesive sheet 4 as shown in FIG. 4(B) to separate the adherend 2 and the adherend 3. The adhesion structure 1 is thus dismantled.

According to the exemplary embodiment, the dielectric adhesive sheet 4 is heated by the dielectric heating in the first step and an external force is applied to at least one of the pair of adherends 2, 3 or the dielectric adhesive sheet 4 in the second step, whereby a pair of adherends 2, 3 can be separated. Accordingly, the pair of adherends 2, 3 of the firmly bonded adhesion structure 1 can be easily separated.

Moreover, since the dielectric adhesive sheet can be sufficiently heated by applying the high-frequency voltage for 1 second to 180 seconds, the pair of adherends can be separated with less force.

[4] Second Exemplary Embodiment

Next, a second exemplary embodiment of the invention will be described. It should be noted that, in the following description, the same reference numerals are given to the same parts as those already described, and the description about the same parts is omitted.

Figure 5:
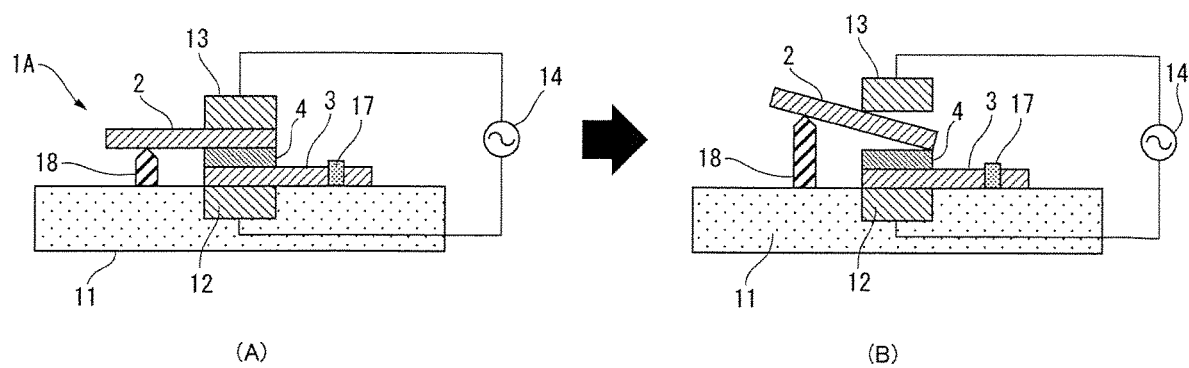
FIG. 5 is a schematic illustration showing a dismantling method of an adhesion structure in a second exemplary embodiment of the invention.

FIG. 5 shows a dismantling method of an adhesion structure 1A according to the second exemplary embodiment. FIG. 5(A) illustrates the first step. FIG. 5(B) illustrates the second step.

The second exemplary embodiment is different from the first exemplary embodiment in that the adherends 2, 3 are larger than the dielectric adhesive sheet 4 in area as shown in FIG. 5(A) and only the adherend 2 is pressed upward.

Specifically, a fixed member 17 presses the adherend 3 onto the base 11 such that the adherend 3 is not moved upward while a pressing member 18 is brought into contact with the adherend 2 in an out-of-plane direction of the adherend 2. It should be noted that, in the adhesion structure 1A, the adherend 2 and the adherend 3 are bonded along the respective adhesive surfaces at offset positions, and the pressing member 18 is in contact with the adherend 2.

The first step is the same as that in the first exemplary embodiment. In the second step, after the upper electrode 13 is retracted upward, the pressing member 18 applies an out-of-plane directional force on the adherend 2 as shown in FIG. 5(B). With this operation, the adherend 2 moves in a direction separating from the adherend 3 to be removed from the dielectric adhesive sheet 4, so that the adherend 2 and the adherend 3 are separated. The adhesion structure 1A can be thus dismantled.

Although the pressing member 18 is brought into contact with a lower surface of the adherend 2 and moves the adherend 2 upward to separate the adherend 2 from the dielectric adhesive sheet 4 in the second exemplary embodiment, the operation for separating the adherend 2 is not limited to this operation. The pressing member 18 may be brought into contact with an upper surface of the adherend 2 and move the adherend 2 downward to separate the adherend 2.

The second exemplary embodiment can also provide the same functions and effects as those in the first exemplary embodiment.

[5] Third Exemplary Embodiment

Next, a third exemplary embodiment of the invention will be described. FIG. 6 shows a dismantling method of the adhesion structure 1 according to the third exemplary embodiment. FIG. 6(A) illustrates the first step. FIG. 6(B) illustrates the second step.

The third exemplary embodiment is different from the first exemplary embodiment in that the first step is performed using a one-side high-frequency dielectric heater 19.

The one-side high-frequency dielectric heater 19 includes a high-frequency alternating power source 14 and an electrode unit 20. The electrode unit 20 includes a first electrode 21A and a second electrode 21B (opposing electrodes) that are spaced from each other at one side of the electrode unit 20 and are each connected to the high-frequency alternating power source 14 via a wire.

In the first step, as shown in FIG. 6(A), when the high-frequency alternating power source 14 is turned on, a high-frequency voltage is applied to between the first electrode 21A and the second electrode 21B to heat the dielectric adhesive sheet 4.

After the dielectric adhesive sheet 4 is heated, as shown in FIG. 6(B), the second step is performed in the same manner as in the first exemplary embodiment, so that the adherend 2 and the adherend 3 are separated to dismantle the adhesion structure 1.

The third exemplary embodiment can also provide the same functions and effects as those in the first exemplary embodiment.

The pair of adherends 2, 3 can be separated by using the one-side high-frequency dielectric heater 19 without holding the adhesion structure 1 between electrodes. Accordingly, the pair of adherends 2, 3 can be easily separated by applying the high-frequency voltage to one side of the adhesion structure 1.

Moreover, since the dielectric adhesive sheet 4 can be sufficiently heated by applying the high-frequency voltage for 1 second to 180 seconds, the pair of adherends can be separated with less force.

[6] Fourth Exemplary Embodiment

Figure 7:
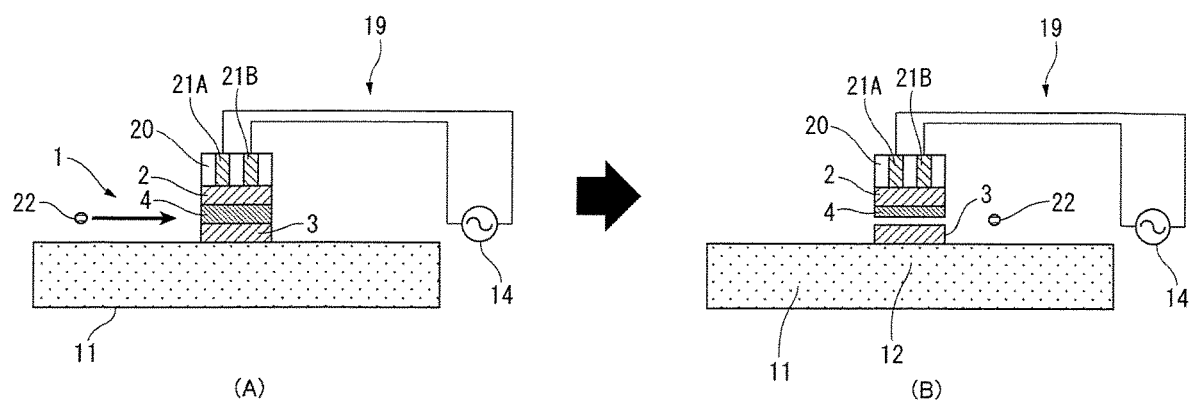
FIG. 7 is a schematic illustration showing a dismantling method of an adhesion structure in a fourth exemplary embodiment of the invention.

Next, a fourth exemplary embodiment of the invention will be described. FIG. 7 shows a dismantling method of the adhesion structure 1 according to the fourth exemplary embodiment. FIG. 7(A) illustrates the first step. FIG. 7(B) illustrates the second step.

The fourth exemplary embodiment is different from the third exemplary embodiment in that, in the second step, the adherend 2 and the adherend 3 are separated by inserting a metal wire 22 into the dielectric adhesive sheet 4 to cause cohesive failure on the dielectric adhesive sheet 4 whose elastic modulus has been lowered by the high-frequency heating, or by applying stress on an adhesive interface between the dielectric adhesive sheet 4 and the adherends 2, 3 to cause interface failure, an adhesive force of the adhesive interface having been lowered by the high-frequency heating.

In the first step, as shown in FIG. 7(A), the dielectric adhesive sheet 4 is heated in the same manner as in the third exemplary embodiment. At this time, the metal wire 22 is kept away from the adhesion structure 1.

After the dielectric adhesive sheet 4 is heated, in the second step, as shown in FIG. 7(B), the metal wire 22 is moved along the adhesive surface of the adherend 3 to cause cohesive failure or interface failure on the dielectric adhesive sheet 4. Subsequently, the adherend 2 and the adherend 3 are separated to dismantle the adhesion structure 1.

The fourth exemplary embodiment can also provide the same functions and effects as those in the first exemplary embodiment.

[7] Fifth Exemplary Embodiment

Figure 8:
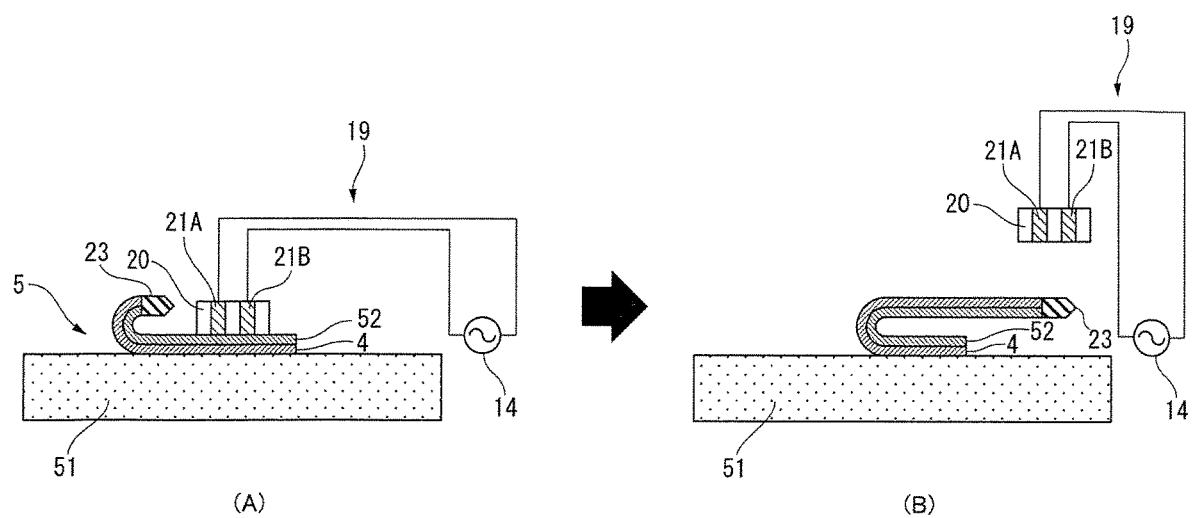
FIG. 8 is a schematic illustration showing a dismantling method of an adhesion structure in a fifth exemplary embodiment of the invention.

Next, a fifth exemplary embodiment of the invention will be described. FIG. 8 shows a dismantling method of the adhesion structure 5 according to the fifth exemplary embodiment. FIG. 8(A) illustrates the first step. FIG. 8(B) illustrates the second step.

In the first step, as shown in FIG. 8(A), the electrode unit 20 is disposed on an upper surface of a sheet including the sheet-shaped base material 52 and the dielectric adhesive sheet 4, and heats the dielectric adhesive sheet 4. For this operation, a peeling jig 23 is attached to an end of the sheet.

In the second step, as shown in FIG. 8(B), the end of the dielectric adhesive sheet 4 held by the peeling jig 23 is pulled with a peeling force in a direction of 90 degrees or 180 degrees to be separated from the adherend 51, thereby dismantling the adhesion structure 5.

When the dielectric adhesive sheet 4 has a large area, the dielectric adhesive sheet 4 is heated through the end of the dielectric adhesive sheet 4 in the first step and is peeled in the second step. The first step and the second step are repeated to gradually peel the dielectric adhesive sheet 4 from the adherend 51.

The fifth exemplary embodiment can also provide the same functions and effects as those in the first exemplary embodiment.

When the adherend 51 (one of the adherends) is used for the floor marking sheet (e.g., a road surface and a floor material) that is immobile, it is preferable to peel the sheet from the adherend 51 with the peeling jig 23 as in the fifth exemplary embodiment.

[8] Sixth Exemplary Embodiment

Figure 9:
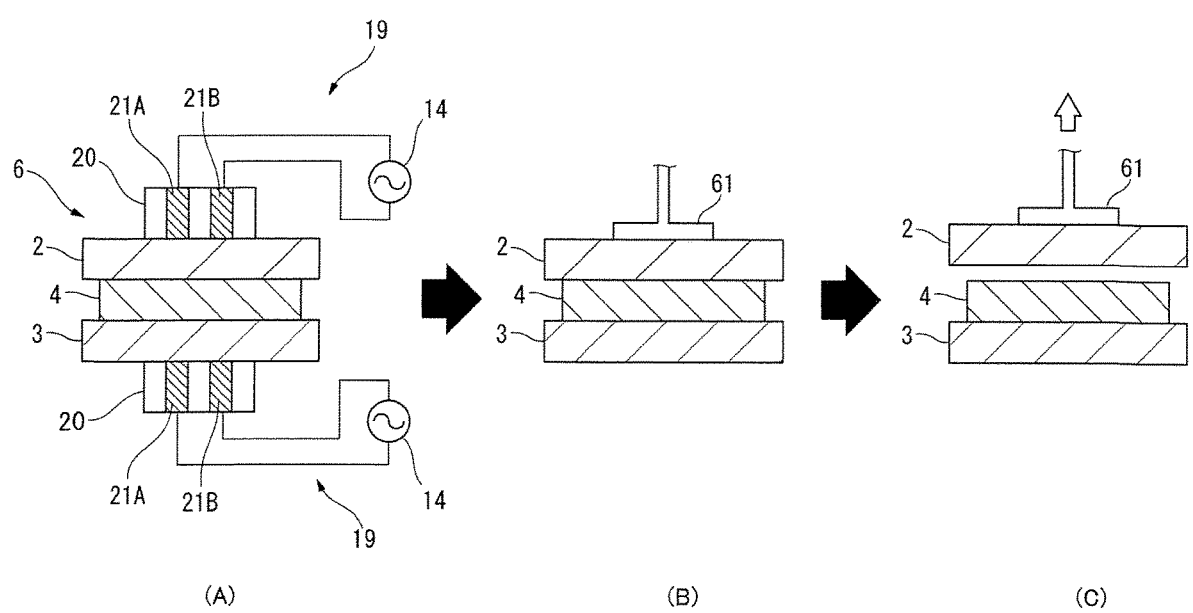
FIG. 9 is a schematic illustration showing a dismantling method of an adhesion structure in a sixth exemplary embodiment of the invention.

Next, a sixth exemplary embodiment of the invention will be described. FIG. 9 shows a dismantling method of an adhesion structure 6 according to the fifth exemplary embodiment. FIG. 9(A) illustrates the first step. FIGS. 8(B) and 8(C) illustrate the second step.

The sixth exemplary embodiment is different from the first exemplary embodiment in that the first step is performed with the one-side high-frequency dielectric heaters 19 being in contact with both of the adherends 2, 3 and the second step is performed with the suction member 61 sucking the adherend 2.

In the first step, as shown in FIG. 9(A), a pair of one-side high-frequency dielectric heaters 19 are brought into contact with the adherend 2 and the adherend 3, respectively, in a manner to hold the adherend 2 and the adherend 3 therebetween. When voltage is applied to both of the one-side high-frequency dielectric heaters 19, the dielectric adhesive sheet 4 is heated from both of the adhesive surface of the adherend 2 and the adhesive surface of the adherend 3. A heating time for melting the dielectric adhesive sheet 4 can be shortened by heating both sides of the dielectric adhesive sheet 4 through the adherends 2, 3.

In the second step, as shown in FIG. 9(B), the suction member 61 is brought into contact with the surface of the adherend 2 and applies a suction force onto the adherend 2.

The suction member 61, which is made of a flexible material such as rubber, has a concave-curved space therein. A suction force of the suction member 61 acts on the adherend 2 by releasing air from the space. Air inside the space may be released by a pushing force of a suction pad and the like, or may be released by a blower and the like connected to the suction member 61.

The sixth exemplary embodiment can also provide the same functions and effects as those in the first exemplary embodiment.

[9] Seventh Exemplary Embodiment

Figure 10:
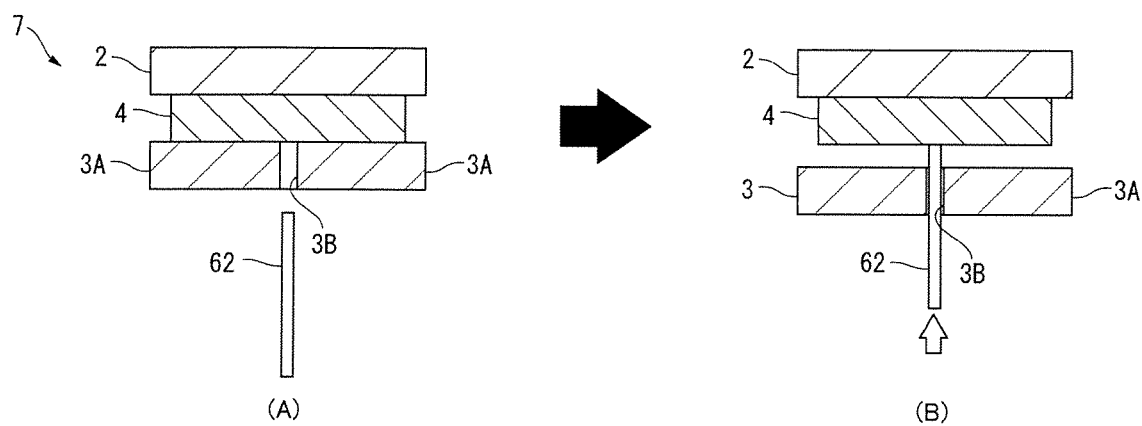
FIG. 10 is a schematic illustration showing a dismantling method of an adhesion structure in a seventh exemplary embodiment of the invention.

Next, a seventh exemplary embodiment of the invention will be described. FIG. 10 shows a dismantling method of an adhesion structure 7 according to the seventh exemplary embodiment. FIGS. 10(A) and 10(B) illustrate the second step.

The seventh exemplary embodiment is different from the first exemplary embodiment in that a gap 3B is formed in an adherend 3A among the adherends 2, 3A, extending along an adhesive surface of adherend 3A.

In the first step, the dielectric adhesive sheet 4 is heated in the same manner as in the first step of one of the first exemplary embodiment, the third exemplary embodiment, and the sixth exemplary embodiment.

In the second step, firstly, as shown in FIG. 10(A), the thrusting member 62 in a form of a stick or a plate is inserted into the gap 3B of the adherend 3A. Next, as shown in FIG. 10(B), the thrusting member 62 is pushed upward, whereby the adherend 3A and the adherend 2 are separated.

The seventh exemplary embodiment can also provide the same functions and effects as those in the first exemplary embodiment.

It should be noted that one of the adherends 2, 3 may be a base material in the first exemplary embodiment to the seventh exemplary embodiment.

EXAMPLES

Next, Examples of the invention will be described. The invention is by no means limited by the examples.

Example 1

A laminate produced by interposing a dielectric adhesive sheet 4 (25 mm×12.5 mm×1 mm) at a predetermined position between two glass fiber reinforced polypropylene plates (50 mm×70 mm×1.5 mm) (adherends 2, 3) was disposed on a lower electrode 12 of a high-frequency dielectric heater (YRP-400T-A manufactured by YAMAMOTO VINITA CO., LTD).

The dielectric adhesive sheet 4, which contained random polypropylene of 100 parts by mass and zinc oxide of 165 parts by mass, the zinc oxide having a mean particle size of 11 μm, had a melting point of 130 degrees C. and heat of fusion of 60 J/g.

With an impedance material analyzer E4991 (manufactured by Agilent Technologies, Inc.), a permittivity (ε') and a dielectric dissipation factor (tan δ) of the dielectric adhesive sheet 4 cut into a predetermined size were measured at 23 degrees C. and 40 MHz frequency to calculate a value of the dielectric property (tan δ/ε'). The obtained value of the dielectric property (tan δ/ε') was 0.016.

Next, an upper electrode 13 was brought into contact with an upper portion of the laminate and a high-frequency voltage at a frequency of 40.68 MHz and an output of 200 W was applied for 20 seconds, so that an adhesion structure 1 in which the adherends 2, 3 were bonded through the dielectric adhesive sheet 4 was obtained. A tensile shear strength of the adhesion structure 1 measured in accordance with JIS K5680 was 16 MPa.

Next, the upper electrode 13 was again brought into contact with the upper portion of the adhesion structure 1 and a high-frequency voltage at the frequency of 40.68 MHz and the output of 200 W was applied for 20 seconds. Immediately after the application of the high-frequency voltage, the upper electrode 13 was separated from the laminate and, simultaneously, the adherend 2 was pressed with the pressing member 16, whereby the adherends 2, 3 were relatively moved in a shear direction to be easily separated from each other, so that the adhesion structure 1 was dismantled.

Example 2

A laminate, which was produced by interposing the dielectric adhesive sheet 4 (25 mm×12.5 mm×1 mm) at a predetermined position between a stainless steel plate (SUS304) (adherend 3) and a glass fiber reinforced polyamide (nylon) plate (adherend 2) (both the adherends in size: 50 mm×70 mm×1.5 mm), was disposed on a horizontal base such that the glass fiber reinforced polyamide plate is positioned above the stainless steel plate.

The dielectric adhesive sheet 4, which contained random polypropylene of 50 parts by mass, a polyester resin of 50 parts by mass, and zinc oxide of 165 parts by mass having a mean particle size of 11 μm, had a value of the dielectric property (tan δ/ε') of 0.014, a melting point of 130 degrees C., heat of fusion of 45 J/g, and a calculated surface roughness Ra of 0.5 μm.

Next, the electrode unit 20 of the one-side high-frequency dielectric heater 19 (TECHNOIRON-400T manufactured by YAMAMOTO VINITA CO., LTD) was brought into contact with the glass fiber reinforced polyamide plate of the laminate and the high-frequency voltage at the frequency of 40.68 MHz and the output of 200 W was applied for 20 seconds, so that the adhesion structure 1 in which the adherends 2, 3 were bonded through the dielectric adhesive sheet 4 was obtained. A tensile shear strength of the adhesion structure 1 measured in accordance with JIS K5680 was 10 MPa.

Then, the electrode unit 20 was again brought into contact with the upper portion of the laminate and the high-frequency voltage at the frequency of 40.68 MHz and the output of 200 W was applied for 20 seconds. Immediately after the application of the high-frequency voltage, the electrode unit 20 was separated from the laminate and, simultaneously, the adherend 2 was pressed with the pressing member 16, whereby the adherends 2, 3 were relatively moved in a shear direction to be easily separated from each other, so that the laminate was dismantled.

Example 3

A 50-μm thick polyvinyl chloride film 52B formed in advance with a 30-μm thick acrylic adhesive layer 52A was laminated on the dielectric adhesive sheet 4 used in Example 1, so that a predetermined laminate was obtained.

Next, a 1-μm thick decorative layer 52E was formed using an inkjet printer on an exposure surface of the polyvinyl chloride film, specifically, a surface of the polyvinyl chloride film opposite from a surface where the acrylic adhesive layer 52A was provided.

Subsequently, a second 200-μm thick polyvinyl chloride film formed in advance with a 30-μm thick acrylic adhesive layer 52F was prepared. A surface of the film was embossed to provide a surface protection layer 52G.

Next, the above second laminate is laminated on the decorative layer 52E with the acrylic adhesive layer 52F, so that the dielectric adhesive sheet 4 integrated with a floor marking sheet 52 was obtained.

A surface of the dielectric adhesive sheet 4 opposite from a surface where the acrylic adhesive layer 52A was formed was attached to a mortar standard test piece (manufactured by K.K. YUKOH Shokai, 5 cm×7 cm×1 cm) (i.e., adherend 51).

Next, the electrode unit 20 of the one-side high-frequency dielectric heater 19 (TECHNOIRON-400T manufactured by YAMAMOTO VINITA CO., LTD) was brought into contact with the upper portion of the adhesive sheet as attached in FIG. 8(A) and the high-frequency voltage at the frequency of 40.68 MHz and the output of 200 W was applied for 70 seconds, so that an adhesion structure 5 attached with the adhesive sheet was obtained.

Further, the electrode unit 20 of the one-side high-frequency dielectric heater 19 was again brought into contact with the upper portion of the laminate and the high-frequency voltage at the frequency of 40.68 MHz and the output of 200 W was applied for 70 seconds. Immediately after the application of the high-frequency voltage, the electrode unit 20 was removed from the floor marking sheet 52, and at the same time, the floor marking sheet 52 was peeled off in a direction of 180 degrees with the peeling jig 23.

The invention claimed is:

1. A method of dismantling an adhesion structure comprising a pair of adherends that are made of the same material or different materials and a dielectric adhesive sheet that is interposed between the pair of adherends and bonds the pair of adherends to each other, the dielectric adhesive sheet comprising: a thermoplastic resin; and a dielectric filler having a mean particle size, which is a median diameter represented by D50, in a range from 1 μm to 30 μm, the mean particle size being measured in accordance with JIS Z 8819-2 (2001), the dielectric filler being a single one of, or a combination of two or more of compounds selected from, zinc oxide, silicon carbide (SiC), anatase-type titanium oxide, and rutile-type titanium oxide, the method comprising:
a first step of heating the dielectric adhesive sheet by dielectric heating; and
a second step of applying an external force to at least one of the pair of adherends or the dielectric adhesive sheet to separate the pair of adherends from the dielectric adhesive sheet.

2. The method of dismantling the adhesion structure according to claim 1, wherein
a shear force is applied to the pair of adherends along adhesive surfaces of the pair of adherends in the second step.

3. The method of dismantling the adhesion structure according to claim 1, wherein
an out-of-plane directional force is applied to the pair of adherends along adhesive surfaces of the pair of adherends in the second step.

4. The method of dismantling the adhesion structure according to claim 1, wherein
a wire is inserted between the dielectric adhesive sheet and one of the pair of adherends and is moved along an adhesive surface of the one of the pair of adherends in the second step.

5. The method of dismantling the adhesion structure according to claim 1, wherein
a peeling force is applied to one of the pair of adherends in the second step.

6. The method of dismantling the adhesion structure according to claim 1, wherein
a suction force is applied to one of the pair of adherends in the second step.

7. The method of dismantling the adhesion structure according to claim 1, wherein
a gap is formed in at least one of the pair of adherends, extending along an adhesive surface of the at least one of the pair of adherends, and
in the second step, an out-of-plane directional force is applied through the gap of the at least one of the pair of adherends.

8. The method of dismantling the adhesion structure according to claim 1, wherein
in the first step, a one-side high-frequency dielectric heater, which comprises an electrode unit whose opposing electrodes are provided on one side of the one-side high-frequency dielectric heater, is disposed at one of the dielectric adhesive sheet and the pair of adherends, and a high-frequency voltage at a frequency in a range from 1 MHz to 200 MHz and at an output in a range from 0.05 kW to 50 kW is applied for 1 second to 180 seconds to perform dielectric heating.

9. The method of dismantling the adhesion structure according to claim 1, wherein
a content of the dielectric filler is in range from 5 parts by mass to 800 parts by mass with respect to the thermoplastic resin of 100 parts by mass.

10. A method of dismantling an adhesion structure comprising a dielectric adhesive sheet, on a surface of which a sheet-shaped base material is laminated, and an adherend bonded to the dielectric adhesive sheet, the dielectric adhesive sheet comprising: a thermoplastic resin; and a dielectric filler having a mean particle size, which is a median diameter represented by D50, in a range from 1 μm to 30 μm, the mean particle size being measured in accordance with JIS Z 8819-2 (2001), the dielectric filler being a single one of, or a combination of two or more of compounds selected from, zinc oxide, silicon carbide (SiC), anatase-type titanium oxide, and rutile-type titanium oxide,
the method comprising:
a first step of heating the dielectric adhesive sheet by dielectric heating; and
a second step of applying an external force to the dielectric adhesive sheet to separate the dielectric adhesive sheet from the adherend.

* * * * *